(12) United States Patent
Börnchen et al.

(10) Patent No.: US 6,905,163 B2
(45) Date of Patent: Jun. 14, 2005

(54) ARMREST ASSEMBLY FOR A MOTOR VEHICLE DOOR

(75) Inventors: Thomas Börnchen, Bamberg (DE); Michael Eisentraudt, Stockheim (DE); Martin Schlechtriemen, Hallstadt (DE); Werner Stammberger, Weissenbrunn (DE); Frank Wagner, Nuremberg (DE)

(73) Assignee: Brose Fahrzeugteile GmbH & Co., KG, Coburg (DE)

( * ) Notice: Subject to any disclaimer, the term of this patent is extended or adjusted under 35 U.S.C. 154(b) by 0 days.

(21) Appl. No.: 10/432,938
(22) PCT Filed: Dec. 6, 2001
(86) PCT No.: PCT/DE01/04677
§ 371 (c)(1), (2), (4) Date: May 28, 2003
(87) PCT Pub. No.: WO02/45993
PCT Pub. Date: Jun. 13, 2002

(65) Prior Publication Data
US 2004/0100122 A1 May 27, 2004

(30) Foreign Application Priority Data
Dec. 6, 2000 (DE) .......................................... 100 60 857
Jan. 29, 2001 (DE) .......................................... 101 04 077

(51) Int. Cl.⁷ ................................................. B60J 9/00
(52) U.S. Cl. ..................................... 296/153; 296/1.09
(58) Field of Search ............................. 296/146.7, 1.09, 296/153; 297/411.36, 411.37, 411.21, 115; 248/118.3

(56) References Cited

U.S. PATENT DOCUMENTS

| 1,970,816 A | * | 8/1934 | Perky .................... 297/411.22 |
| 3,637,253 A | * | 1/1972 | Maule et al. ............. 296/65.11 |
| 4,619,478 A | * | 10/1986 | Heimnick et al. .......... 296/153 |
| 4,674,790 A | * | 6/1987 | Johnson ...................... 296/153 |
| 4,877,287 A | * | 10/1989 | Escaravage ............ 297/411.36 |

(Continued)

FOREIGN PATENT DOCUMENTS

| DE | 40 02 243 A1 | 8/1991 |
| DE | 41 20 617 C2 | 12/1992 |
| DE | 41 35 279 A1 | 4/1993 |

(Continued)

OTHER PUBLICATIONS

International Search Report of PCT/DE01/04677, dated May 29, 2002.
International Preliminary Examination Report of PCT/DE01/04677, dated Aug. 2, 2002.
English translation of International Preliminary Examination Report (IPER) for International Application PCT/DE01/04677 filed Dec. 6, 2001.

*Primary Examiner*—Stephen Gordon
(74) *Attorney, Agent, or Firm*—Christie, Parker and Hale, LLP (57) ABSTRACT

An armrest assembly for a motor vehicle door provides an armrest that may be positionally adjusted by a drive unit and a transfer member which may be displaced along an adjustment direction on activating the drive unit. The armrest may be connected to the drive unit. The position of the armrest in the motor vehicle door may be adjusted in the vehicle longitudinal direction and/or in a direction perpendicular to the vehicle longitudinal direction and perpendicular to the adjusting direction of the armrest.

29 Claims, 9 Drawing Sheets

U.S. PATENT DOCUMENTS

| | | | | |
|---|---|---|---|---|
| 4,907,835 A | * | 3/1990 | Salters | 296/1.09 |
| 4,984,847 A | * | 1/1991 | Bedu et al. | 297/411.38 |
| 5,527,084 A | * | 6/1996 | Scherf | 296/153 |
| 5,921,610 A | * | 7/1999 | Grimes | 296/153 |
| 5,964,497 A | * | 10/1999 | Wiles | 296/153 |
| 5,967,594 A | * | 10/1999 | Ramanujam | 296/153 |
| 6,145,919 A | * | 11/2000 | Mysliwiec et al. | 296/153 |

FOREIGN PATENT DOCUMENTS

| | | |
|---|---|---|
| DE | 43 21 335 C2 | 1/1995 |
| DE | 196 53 722 A1 | 7/1998 |
| DE | 195 27 912 A1 | 8/1998 |
| DE | 197 25 899 C2 | 12/1998 |
| DE | 198 31 205 A1 | 1/2000 |
| DE | 198 59 553 A1 | 3/2000 |
| DE | 198 55 285 A1 | 6/2000 |
| DE | 199 29 564 A1 | 1/2001 |
| DE | 199 41 127 A1 | 3/2001 |
| EP | 0 631 901 A1 | 1/1995 |
| EP | 1 048 517 A1 | 11/2000 |

* cited by examiner

ARMREST ASSEMBLY FOR A MOTOR VEHICLE DOOR

CROSS-REFERENCE TO RELATED APPLICATION

This application is a National Phase Patent Application of International Application Number PCT/DE01/04677, filed on Dec. 6, 2001, which claims priority of German Patent Application Number 100 60 857.4, filed Dec. 6, 2000, and German Patent Application Number 101 04 077.6, filed Jan. 29, 2001.

BACKGROUND OF THE INVENTION

The invention relates to an armrest assembly for a motor vehicle door.

The invention relates, more particularly, to an armrest which may be adjustable in position, more particularly in its vertical position, by means of a drive unit, and a transfer member which may be plate-shaped and displaced along an adjustment direction on activating the drive unit to which the armrest may be connected. The coupling between the drive unit and the transfer member can be produced through gearing through which the transfer member is displaced when the drive unit is activated.

DE 40 02 243 A1 provides a vertically adjustable armrest provided on the door of a motor vehicle which has a guide for moving the armrest up and down, and means for fixing the armrest in a desired position. The guide is thereby mounted together with the drive elements of the adjustable armrest on a base plate which is fixed on the inside panel of the door. There is a shortcoming of this design, however, in that fixing the base plate of the vertically adjustable armrest on the inside panel of the door also fixes at the same time the position of the armrest relative to the inside trim of the door which as a design element covers the inside panel of the door from the interior space of the vehicle.

Since the position of the inside trim in relation to the inside panel of the door has a restricted tolerance this results in different arrangements of the armrest relative to the inside trim which are dependent on tolerance. This has a detrimental effect on the design of a vehicle door.

SUMMARY OF THE INVENTION

The object of the invention is to provide an armrest assembly as generally described above, but which overcomes the drawbacks mentioned above.

This is achieved according to the invention by providing an armrest assembly. The position of the armrest of the armrest assembly in the vehicle door can be adjusted in the longitudinal direction of the vehicle and/or in a direction generally perpendicular to the longitudinal direction as well as generally perpendicular to the adjusting direction of the armrest.

Tolerances which exist between the individual structural assemblies of the vehicle door, more particularly between the inside door panel and the inside door trim, can be compensated so that the armrest occupies a defined position relative to the inside trim.

The invention is particularly suitable for use with armrests which have a modular type adjusting mechanism in which the drive unit, the associated gearing and the transfer member are mounted on a common support which can be fixed on a vehicle door, more particularly on the inside panel thereof. The drive, gearing and transfer member can make up one pre-checkable structural unit which, when the drive unit is activated, generates an adjusting movement of the transfer member without this modular unit already being installed in the vehicle door. The adjusting mechanism of the armrest can therefore be pre-fitted complete on a support and checked for functional reliability away from a vehicle door.

After the adjusting mechanism has been installed in a vehicle door, the position of the adjustable armrest which can be connected to the transfer member either before or after the adjusting mechanism has been installed in the vehicle door, is then adjusted so that a defined predeterminable position of the armrest relative to the inside door trim is then produced.

Adjusting the position of the armrest relative to the inside door trim is thereby carried out so that the armrest can be displaced vertically without the inside trim becoming curved through contact with the armrest. At the same time the clearances between the armrest and inside door trim are set so that they remain out of sight as much as possible from the vehicle occupant.

A guide extending in the vehicle longitudinal direction and which the armrest engages by a guide element, may serve to adjust the position of the armrest in the vehicle longitudinal direction in an exemplary embodiment.

The guide element can be for example a connecting element through which the armrest is connected to the transfer member which can be displaced in order to adjust the height of the armrest.

The connecting element may advantageously extend in a spacer element which is connected to the armrest, more particularly the connecting element may be moulded in one piece with same, and can be moved together with the connecting element in the aforementioned guide in the vehicle longitudinal direction. An additional or alternative possibility for adjustment in the vehicle longitudinal direction is provided if the connecting element is movable in the spacer element in the vehicle longitudinal direction so that the armrest can be positionally adjusted relative to the transfer member in the vehicle longitudinal direction.

The guide which is provided for adjusting the armrest in the vehicle longitudinal direction extends in the inner trim of the door and is advantageously provided at its edge with a guide frame which has particularly good sliding properties. The transfer member on the one hand and the armrest on the other are arranged on either side of the inside door trim so that the guide extends between the transfer member and armrest.

Adjusting the position of the armrest perpendicular to the vehicle longitudinal direction and perpendicular to the adjusting direction of the armrest may be carried out by means of an elastically deformable element which can be disposed, for example, between the inside door trim and the transfer member, or between the inside door trim and the armrest.

Through the deformation of this elastic element which may be a spring or rubber element in various exemplary embodiments, it is possible to adjust the distance between the armrest and, where applicable, the transfer member and the inside door trim whereby the deformation of the elastic element is preferably undertaken at the same time by actuating the connecting element through which the armrest is connected to the transfer member. For this purpose the connecting element can act on the elastic element for example through the spacer element which surrounds the connecting element.

Furthermore, guide rails on which the transfer member is guided can be provided on the support plate on which the adjusting mechanism of the armrest can be prefitted. In order to accommodate the drive motor the support can have a trough which surrounds the drive at least in part. The gearing which transfers the drive force of the motor to the transfer member has at least one gearing part which can be moved along the guide rail and which can advantageously be mounted in a space enclosed by the guide rail. Fixing means provided on the gearing part are used to fix the transfer member which is guided, in turn, along the guide rails by means of suitable sliders. The gearing can be for example a spindle or rack and pinion gearing which couples the drive to the transfer member.

Another aspect of the invention is a method for assembling an armrest assembly in a vehicle door. According to this exemplary embodiment, the armrest of the armrest structural assembly is adjusted relative to the inside door trim in the vehicle longitudinal direction and/or in a second direction perpendicular to the vehicle longitudinal direction as well as perpendicular to the adjusting direction of the armrest.

The adjustment in the vehicle longitudinal direction may be undertaken by means of a guide provided for this purpose and which extends in this direction whereas the adjustment in the second direction is undertaken by deformation of an elastic element provided for this purpose.

BRIEF DESCRIPTION OF THE DRAWINGS

Further features and advantages of the invention will now be explained in the following detailed description with reference to embodiments illustrated in the following drawings in which:

FIGS. 1b–1d show three different views of the exemplary adjusting mechanism of FIG. 1a;

FIG. 9b shows an exemplary embodiment of a modification of the embodiment of FIG. 9a;

DETAILED DESCRIPTION

Figure 13A:
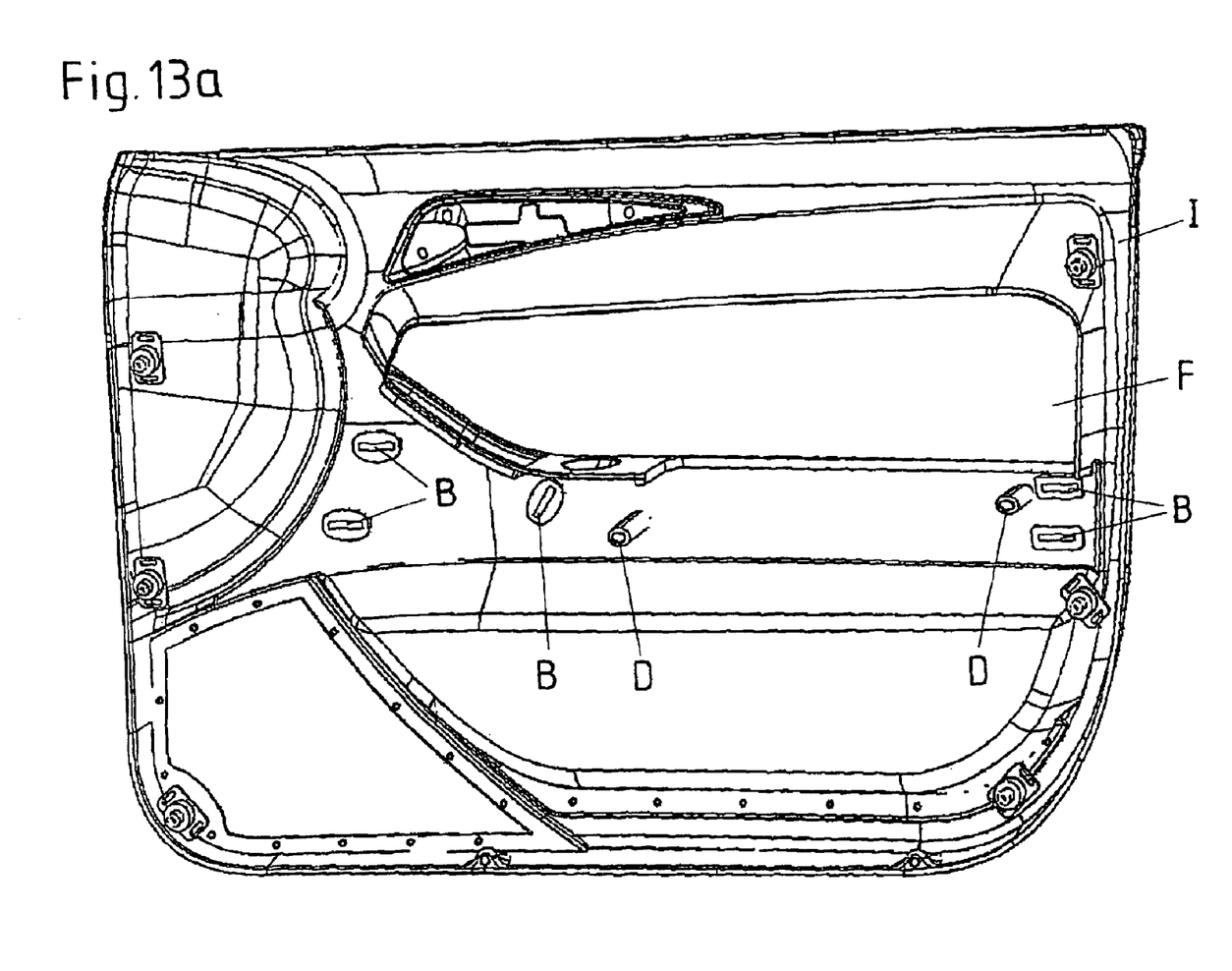
FIGS. 13a/13b show two different views of an inside door trim.
Figure 13B:
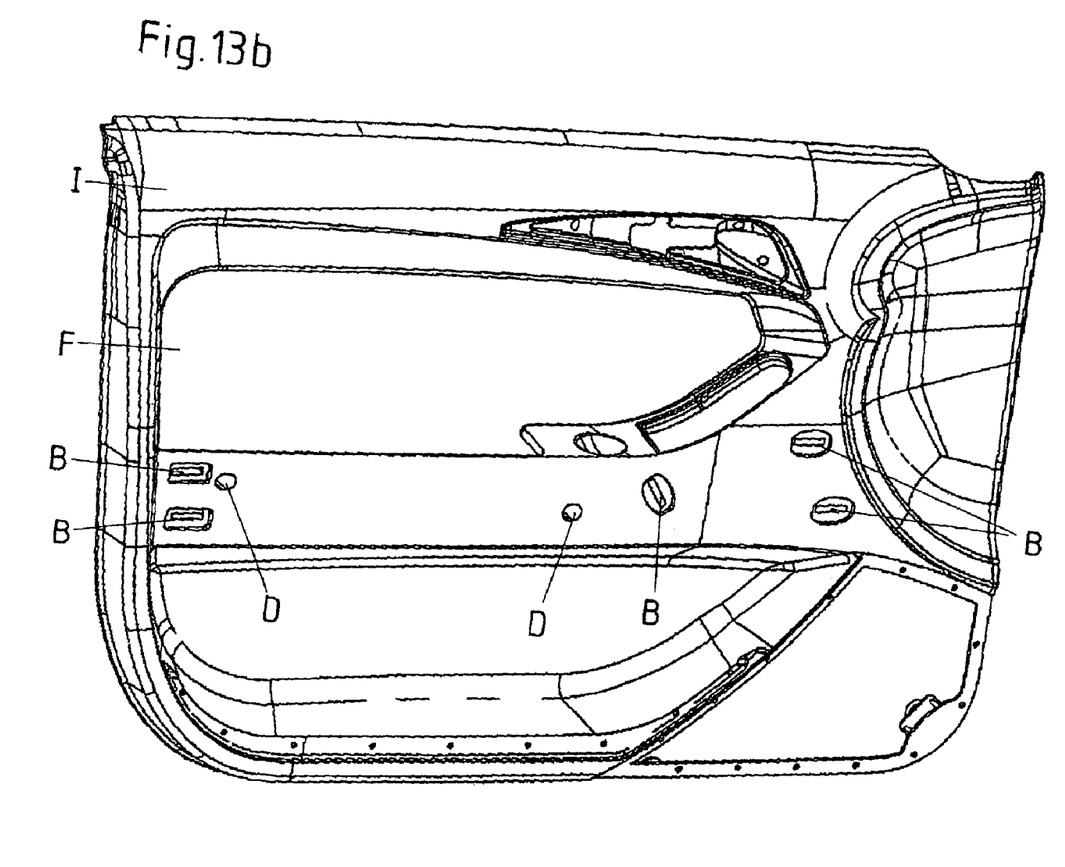

FIGS. 13a and 13b show a view seen from the inside door panel and a view seen from inside the vehicle, respectively, of an inside door trim I which is used to cover and line the inside panel of the vehicle door in the inner space of the vehicle. The inside door trim I has on its reverse side two spacer elements D which are supported by their ends that face away from the inside trim on the inside door panel or on a base plate connected to the inside panel when the inside door trim I is fixed on the inside door panel. The distance between the inside door trim and inside door panel is thereby fixed. The spacer elements D are hollow cylindrical forms so that fixing screws can be passed through same to fix the inside door trim on the inside door panel.

The inside door trim I furthermore has a clearance F which enables the armrest to be fitted. Underneath the clearance F there are fixing sites B for fixing a décor strip on the inside door panel 1.

Figure 14:
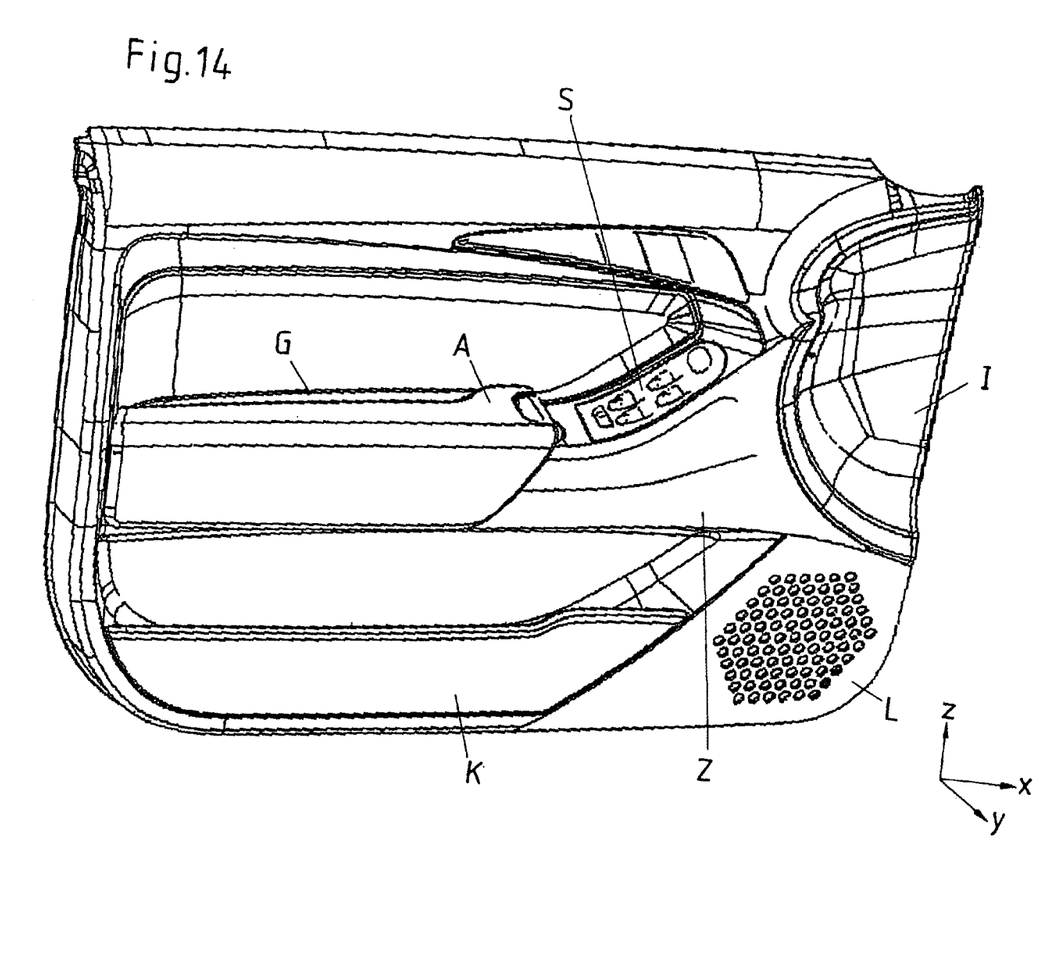
FIG. 14 shows the inside door trim according to FIGS. 13a and 13b with built-in armrest.

FIG. 14 shows the inside door trim in a view from inside the vehicle and according to FIG. 13b. FIG. 14 shows an armrest assembly having an armrest A which has a grab indent G. Furthermore a switch block S is mounted in front of the armrest A through which electrical function components of the vehicle such as for example electric window lifters or electric seat adjusters can be operated.

Underneath the armrest A there is a décor strip Z fixed on the inside door trim I. Underneath the décor strip Z there are a card pocket K and speaker cover L.

Details of the armrest assembly will now be explained with reference to FIGS. 1a to 12. The assembly includes a height-adjustable armrest A (i.e. adjustable along the vertical vehicle axis z), as well as means for adjusting the armrest A relative to the inside door trim I along the predetermined directions x,y.

Figure 1A:
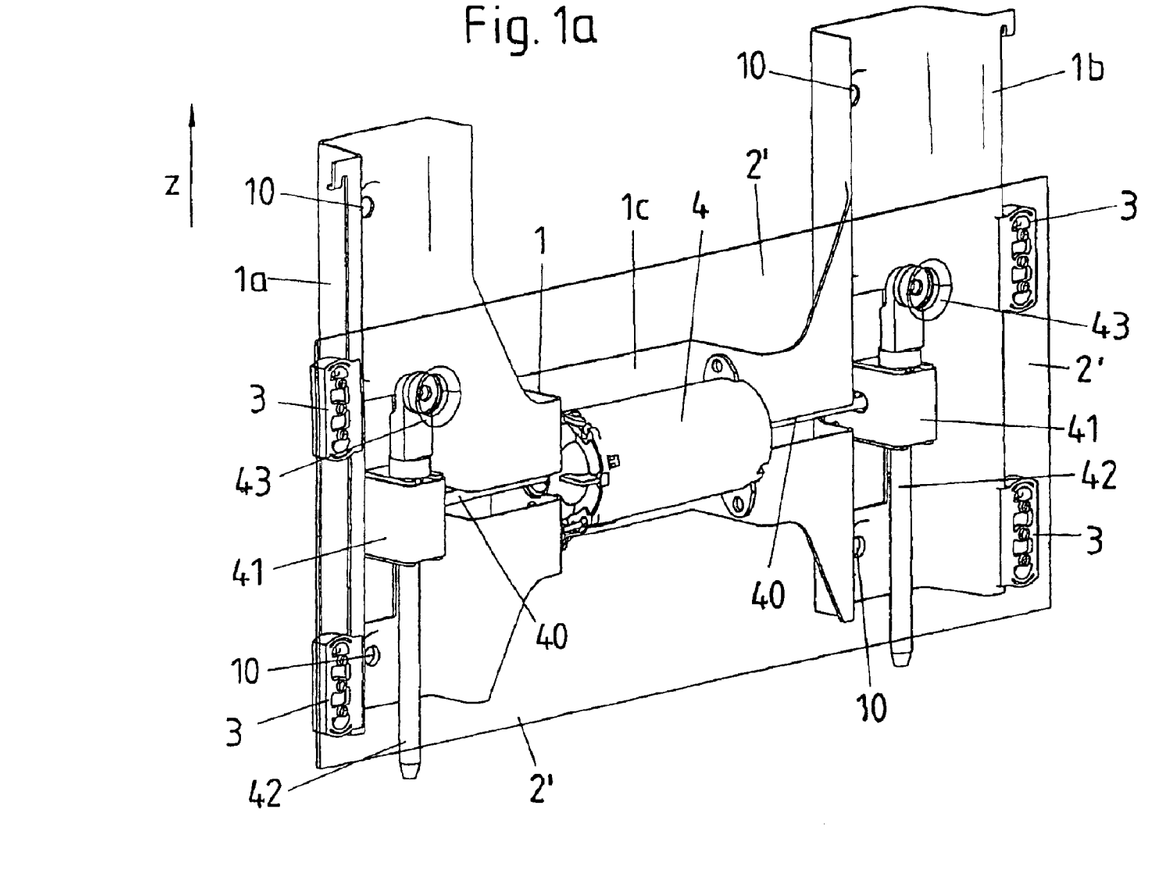
FIG. 1a shows a perspective view of an exemplary adjusting mechanism for an armrest.
Figure 1B:
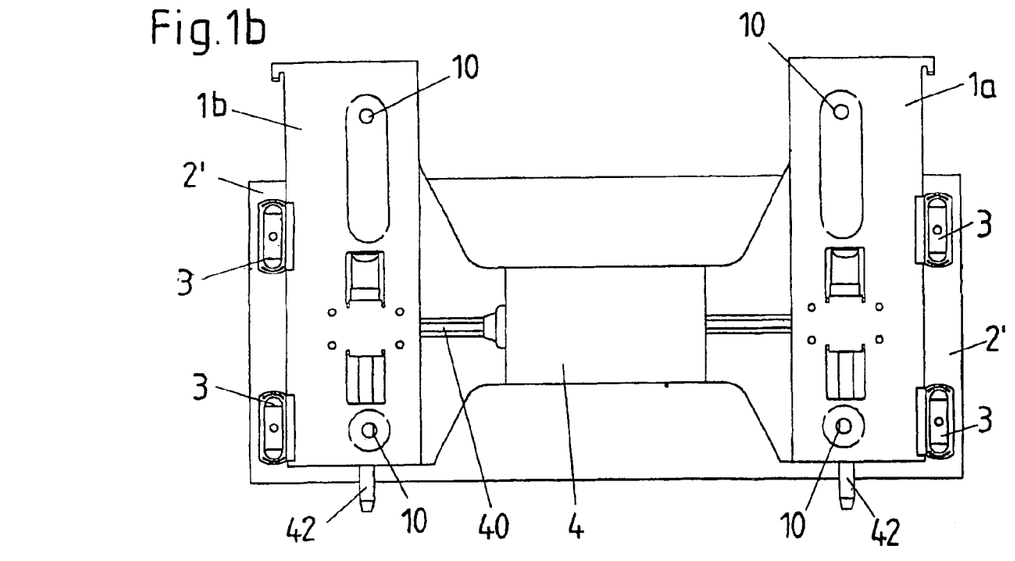
Figure 1C:
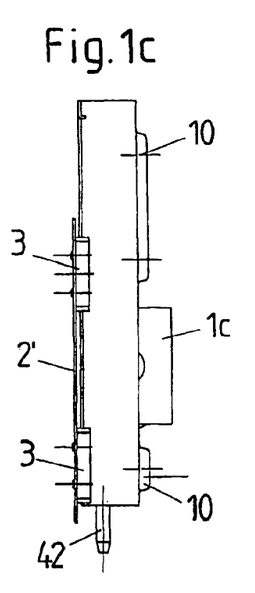
Figure 1D:
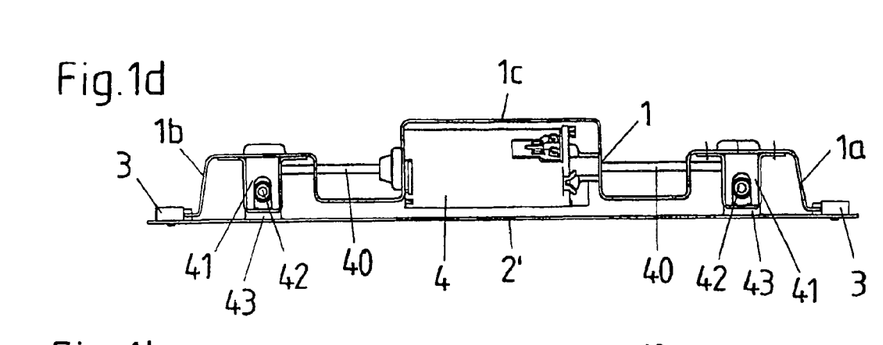

FIG. 1a shows a front, perspective view of an adjusting mechanism for an armrest as a pre-fitted structural unit which is designed for use in a door box of a motor vehicle door and which is fixed through several fixing sites 10 on the inside door panel or a base plate (door module support) which is connectable therewith FIGS. 1b–1d show the rear view, side view and plan view relative to the front perspective view of the structural unit of FIG. 1a which can be used to adjust the height of an armrest substantially along the vertical vehicle axis (z-axis).

A one-piece base element 1 whose edge areas are shaped as guide rails 1a, 1b and are connected together through a web 1c which includes several bends to accommodate the motor 4, makes up the support of the structural unit. Reduction gears 41 are mounted in the guide rails 1a, 1b so that a spindle 42 can be adjusted vertically along the relevant guide rail 1a. The driving force of the motor 4 is transferred from each drive shaft 40 to the gearing 41 whereby the drive shafts 40 can be inserted through a slot area of the base element 1 until they reach their ideal position.

A support plate 2' (shown transparently in FIG. 1a), on which the armrest is to be fitted and which serves as a transfer member for transferring an adjusting movement of the spindle to the armrest, is guided by means of sliders 3 along the adjusting path on the guide rails 1a, 1b. The adjusting force is introduced from the spindles 42 into the support plate 2' is through the fixing sites 43.

In another exemplary embodiment in which stable guide conditions are maintained along the adjusting path, the adjustment can also be carried out by only one spindle mounted roughly centrally between the guide rails 1a, 1b. In another exemplary embodiment, a rack and pinion combination can be used in place of a spindle.

The structure described is characterised by high rigidity, the ability to precheck all functioning parameters of the adjusting mechanism outside of the vehicle door and—as a result of the symmetrical construction—by its ability to be used for left and right hand doors. Furthermore the support plate 2' which in the installed state faces inwards (towards the inside of the vehicle) and which covers the structural components of the adjusting mechanism, ensures that in the event of a side impact crash it guards against the penetration of sharp edges and the like. Correspondingly the adjusting mechanism is advantageously mounted as deep as possible inside the door in an exemplary embodiment.

If the corresponding vehicle is equipped with an electronic memory device for starting up stored setting parameters, then in addition to the positions for the seat, mirror and steering wheel, different positions for the armrest can also be started up automatically. Furthermore if the adjustment of the armrest is to take place by using a window lifter drive provided with anti-nip (i.e., anti-jamming) protection, then the anti-nip protection can also be readily produced cost-effectively for the armrest adjustment using the same electronics in an exemplary embodiment. A need for anti-jamming protection of the armrest can arise in particular if when the armrest is lowered a gap is reduced (e.g. between the upper edge of a stowage compartment) where the dimensions could be suitable for nipping parts of the body.

FIGS. 2 to 5 show different exemplary embodiments, in particular, modifications of the embodiment of FIGS. 1a to 1d whereby the same reference numerals are used for those component parts and assemblies which coincide with those in FIGS. 1a to 1d. For a more detailed explanation of these structural parts and groups, reference is made to the details given for FIGS. 1a to 1d.

Figure 2:
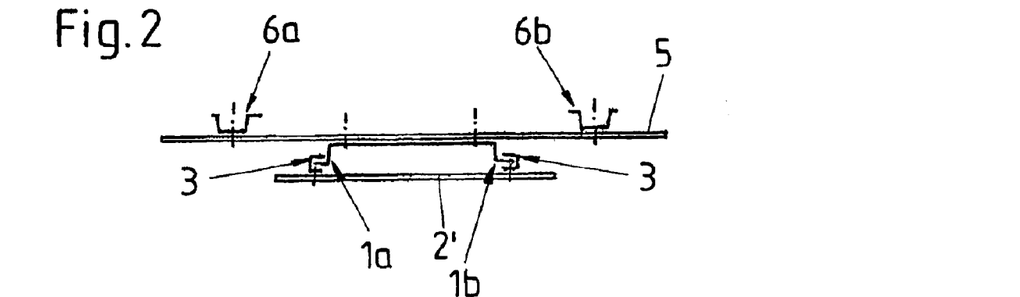
FIG. 2 shows another embodiment that is generally a first modification of the adjusting mechanism of FIGS. 1a–1d.

The diagrammatic view of FIG. 2 shows an adjusting mechanism 1a, 1b, 2', 3 for an armrest which can correspond for example to the structural type according to FIGS. 1a to 1d and which is mounted on a base plate 5 of a vehicle door (door module support). Two guide rails 6a, 6b of a cable window lifter, for example, extend on the side of the base plate 5 which is remote from the adjusting mechanism 1a, 1b, 2', 3, and provides water-proof covering of a large-surface assembly opening in the inner skin of a door box. The adjusting mechanism, which is combined into one structural unit which can be prefitted and pre-checked on a base element 1 (see FIGS. 1a to 1d), is integrated into a larger door module which is mounted on a base plate 5 in the illustrated embodiment.

Figure 3:
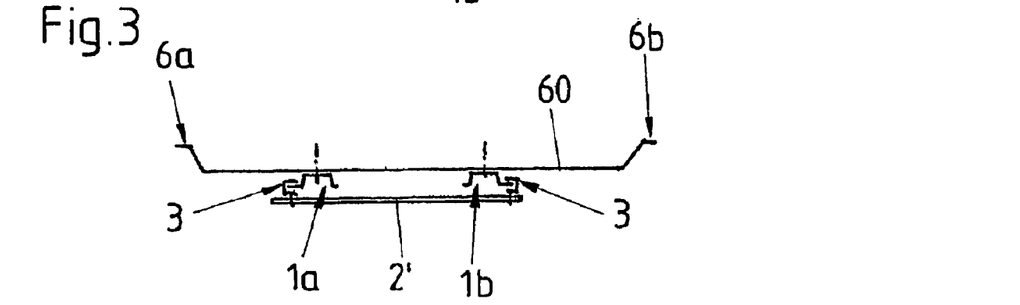
FIG. 3 shows another embodiment that is generally a second modification of the adjusting mechanism of FIGS. 1a–1d.

According to the diagrammatic illustration of FIG. 3 the edge areas of a plate-shaped base element 60 of the adjusting mechanism 1a, 1b, 2', 3 itself are shaped into guide rails for a window lifter. The support plate 2' of the armrest adjuster is guided through followers 3 on separate guide rails 1a, 1b which are fixed on the base element 60 of the adjusting mechanism.

Figure 4:
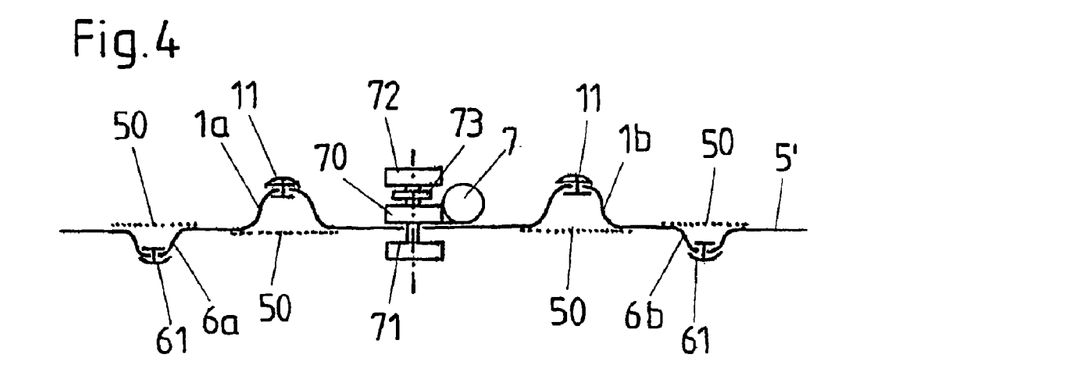
FIG. 4 shows another embodiment that is generally a third modification of the adjusting mechanism of FIGS. 1a–1d.
Figure 5:
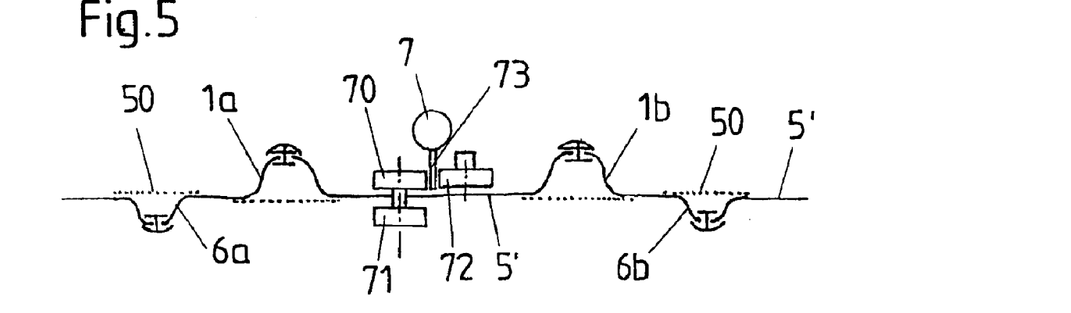
FIG. 5 shows another embodiment that is generally a fourth modification of the adjusting mechanism of FIGS. 1a–1d.

An even higher degree of integration is achieved according to the exemplary embodiments of FIGS. 4 and 5. Both the guide rails 6a, 6b of a cable window lifter and also the guide rails 1a, 1b of the armrest adjuster are hereby integrated in one piece in a support 5' which forms both the base element of the adjusting mechanism for an armrest and also the base plate of a larger door module which may additionally include a window lifter in an exemplary embodiment. The guide rails 1a, 1b, 6a, 6b are formed by curvatures protruding on alternate sides and having slots for receiving and guiding the followers 11, 61.

In order to be able to ensure an effective wet/dry space separation in a vehicle door using the support 5', the slots of the guide rails may be sealed. This can be achieved in simple manner through an adhesive strip 50 which is stuck onto the base surface of the support 5' so that the area of the curvature is covered.

In an exemplary embodiment, a common motor may be provided for both adjusting devices. Such an arrangement reduces the material expense further and saves weight and costs. According to the diagrammatic illustration of FIG. 4 the axes of a gearing 70 for the window lifter and gearing 72 for the armrest adjustment are mounted coaxial. A motor 7 is coupled directly to the gearing 70 of the window lifter through which the adjusting force can be passed onto a cable drum 71 when an associated clutch 73 is not activated. When the clutch 73 is activated the force flow to the cable drum 71 is interrupted and instead the force is passed onto the gearing 72 for the armrest adjustment. Passing the adjusting force through the gearing 70 of the window lifter has the advantage that the cost for the reduction gearing 72 of the armrest adjustment can be considerably reduced. The adjusting speed of the armrest may be 2 to 3 cm per second below the adjusting speed of the window pane in one exemplary embodiment.

According to the diagrammatic illustration of the exemplary embodiment of FIG. 5 the axes of the two gears 70 and 72 run parallel. The driving force of the motor is supplied by means of the clutch 73 to one or other of the adjusting devices according to requirements. A multiple use of gear stages is not provided here.

Figure 6:
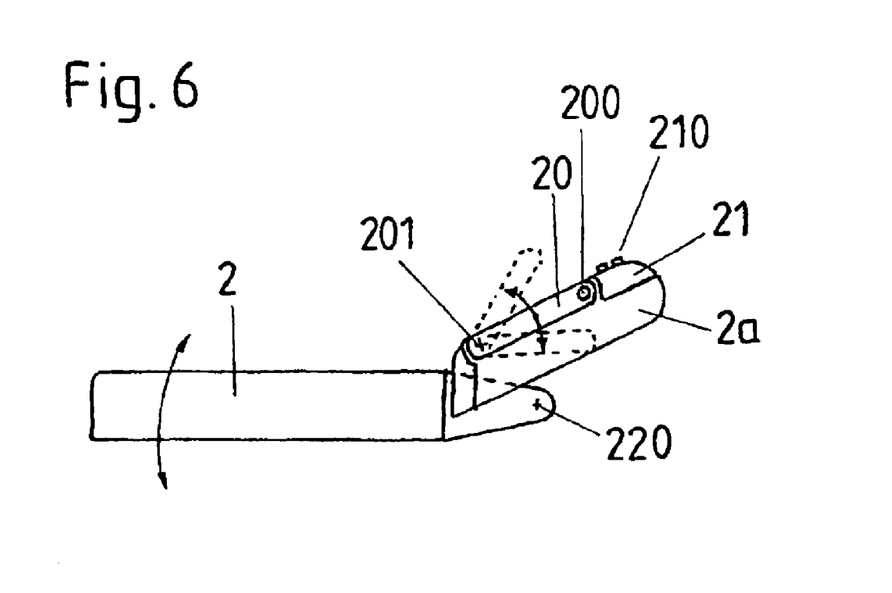
FIG. 6 shows an embodiment for a manual drive of a vertically adjustable armrest.

FIG. 6 shows an armrest 2 (arm support) which is suspended for swivel movement about an axis 220 and which can be adjusted manually independently by a handle part 2a fixed in the door. A grab handle 20 which can swivel a restricted amount about a further axis 201 functions as the drive lever and is in active connection with a step switch mechanism (not shown) through the said axis 201. The structure and function of such exemplary step switch mechanisms are provided in DE 41 20 617 C2 and DE 43 21 335 C2, for example.

If no adjustment of the armrest is undertaken then the grab handle 20 is located in a neutral position (solid line) which may be locked in order to prevent any undesired adjusting movements. In order to be able to make an adjustment to the incline or height of the armrest, first the unlocking button 200 is pressed and then the grab handle is swivelled down in order to lower the armrests or the grab handle is swivelled up in order to raise the armrest. A return spring (not shown) may be provided to ensure that the grab handle automatically returns to its neutral position in which it forms one uniform contour with the switch block 21 which supports the switches 210.

Figure 7:
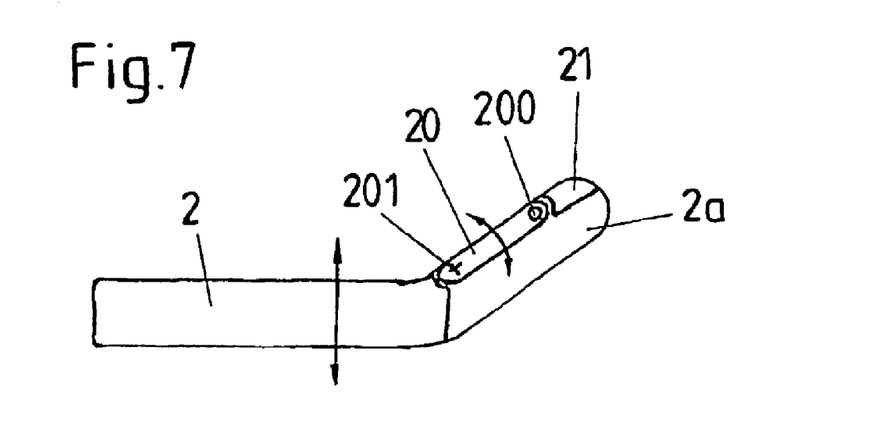
FIG. 7 shows an exemplary embodiment of a modification of the embodiment of FIG. 6 with respect to the actuating element of the manual drive.

The diagrammatic illustration of FIG. 7 differs from the embodiment of FIG. 6 in that the grip part 2a and the armrest form one common adjustable unit.

Figure 8:
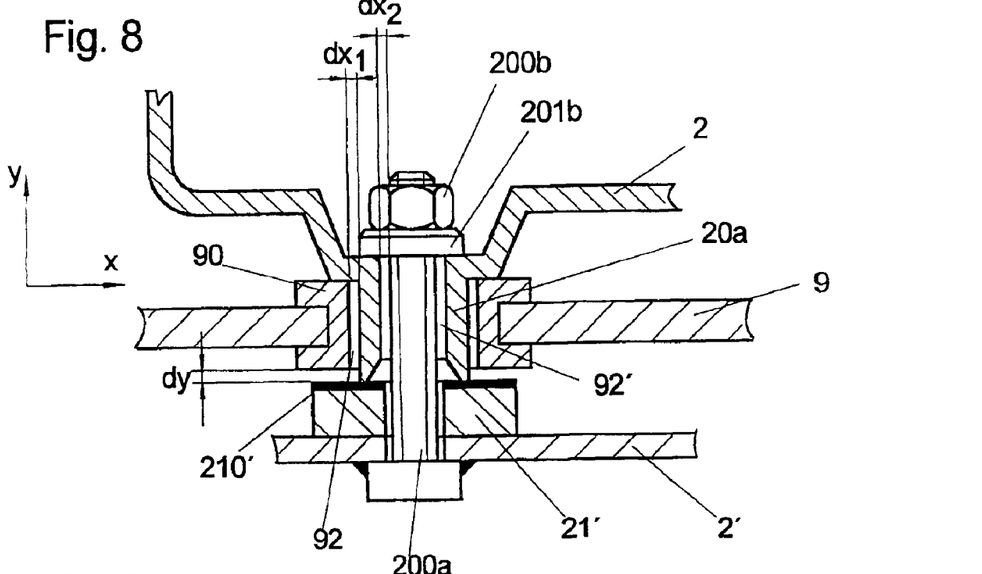
FIG. 8 shows a sectional view through a fixing area between an exemplary armrest and a transfer member of the adjusting mechanism.

FIG. 8 shows a cross-section through a fixing area between an armrest 2 and the associated support plate 2' of the adjusting mechanism. According to this embodiment, a spacer element in the form of a spacer sleeve 20a is moulded in one piece on the armrest 2 and its free end is supported on a preferably spring-elastic further spacer element 21' with fitted metal disc 210' which in turn is mounted on the support plate 2'. The connecting force required to fix the armrest 2 on its support plate 2' is applied by a threaded bolt 200a which passes through the spacer sleeve 20a, the further elastic spacer element 21' and the support plate 2' and clamps them together with an associated nut 200b in force-locking connection. The elastic spacer element 21' serves to provide a rattle-free spacing between the adjusting mechanism, more particularly the support plate 2' of the armrest 2, and the inside door trim 9 and may be formed in one piece on the support plate 2 according to an exemplary embodiment.

An inside door trim 9 which extends between the armrest 2 and the support plate 2' which are moved in unison when adjusting the height of the armrest 2, has a slot 92 extending in the adjusting direction z along the common adjusting path of the armrest 2 whereby the spacer sleeve 20a and the threaded bolt 200a are guided in the slot in the adjusting direction z of the armrest 2 and the edge of the slot is provided with a frame which forms a slide element 90. In order to ensure smooth running, the spacer sleeve 20a is designed so that the edge of the inner trim 9 or the slide element 90 fitted thereon does not become clamped between the fixing area of the armrest 2 and the elastic spacer element 21' or support plate 2'.

Since the spacer element 21' is designed elastically as a spring element (e.g. a plate spring) or the like (e.g. as a rubber block) action on the spacer element 21' by means of the threaded bolt 200a through the spacer sleeve 20a in a direction y across the adjusting direction z of the armrest 2, and across the vehicle longitudinal direction x, can both ensure a sufficient spacing between the inside door trim 9 and the support plate 2', and also provide the means for positioning the area of the armrest 2 which serves for fixing on the support plate 2' in relation to the edge 90 of the slot 92 in the inner trim 9 as required for a specific type of door. On tightening up the screw bolt 200a and the associated nut 200b, the spring elastic spacer element 21' becomes increasingly compressed through the action of the spacer sleeve 20a into which forces are introduced by the nut 200b through a washer 201b until the armrest 2 and the support plate 2' have reached the desired position in relation to the inside door trim 9. More particularly, the play dy with which the inside trim 9 or its slide element 90 is guided between the armrest 2 and the support plate 2', is set to a desired value which enables a sufficiently friction-free movement of the armrest 2 and support plate 2' relative to the inside door trim 9 along the adjusting direction z (see also FIG. 9a) and on the other hand the clearance is minimised such that there is essentially no sign of the gap between the armrest 2 and inside door trim 9 to a vehicle occupant. The play dy is shown in FIG. 8 by way of example between the elastic spacer sleeve 21' or the metal disc 210 mounted thereon and the slide element 90 of the inside door trim 9. Play dy represents the entire play or variance with which the slide element 90 is mounted between the elastic spacer element 21' and the fixing area of the armrest 2. After adjusting the position of the arm rest 2 by compressing the elastic spacer element 21' a small gap remains between the fixing area of the armrest 2 and the slide element 90, but which is not visible by the occupant (and also in FIG. 8), in order to avoid excessive friction when the armrest is displaced along the slot 92 in the adjusting direction.

Figure 9A:
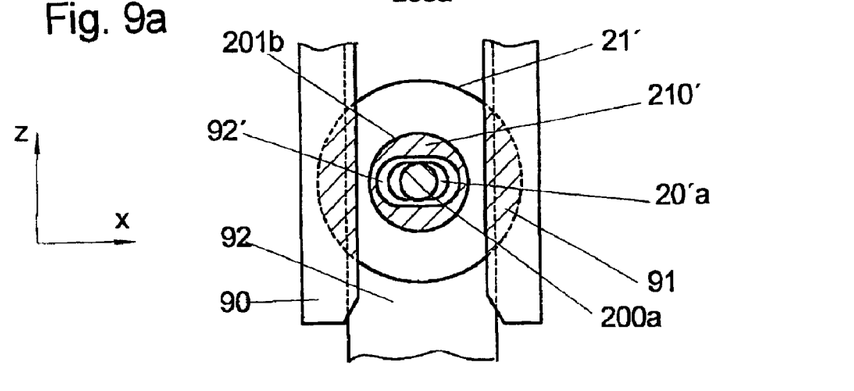
FIG. 9a shows a cross-sectional view through the fixing area of the embodiment shown in to FIG. 8.
Figure 9B:
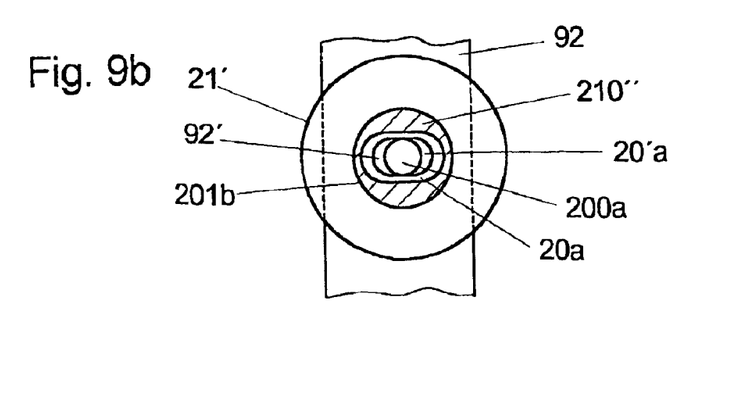

Furthermore the spacer sleeve 20a according to FIG. 9a has the cross-section of an oblong hole 20'a which extends in the longitudinal direction x of the vehicle and through which the threaded bolt 200a is passed, and thus provides, by means of a guide 92' formed through the oblong hole, for compensating the tolerance between the armrest 2 and support plate 2' (and thus also between the armrest 2 and inside door trim 9) by a predetermined amount 2*d×2 in the vehicle longitudinal direction x (driving direction). Furthermore the spacer sleeve is guided with a defined play 2*d×1 relative to the vehicle longitudinal direction x in the gap 90 of the inside door trim 9 so that the armrest 2 and the support plate 2' can furthermore be adjusted jointly relative to the inside door trim in the vehicle longitudinal direction x.

The areas shaded in FIG. 9a represent the supporting faces 91 and 210' between the slide 90 on the edge side and the arm rest 2 or spacer element 21' on one side and between the spacer bush 20a and spacer element 21' on the other side.

Figure 10:
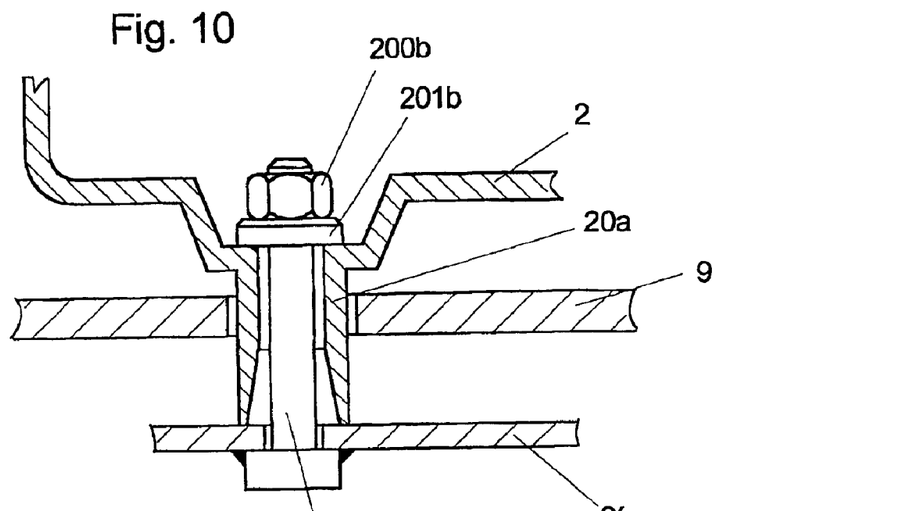
FIG. 10 shows a sectional view through a fixing area according to FIG. 9b.

In an exemplary embodiment, the armrest 2 and support plate 2' are connected using two fixing and guide areas provided one above the other along the guide slot 92 in the adjusting direction z. The lower of the two superposed fixing and guide areas, which is generally out of sight for the vehicle occupant, can be designed simpler to save costs, as shown in FIG. 10 together with the associated illustration in FIG. 9b. The guide of the armrest 2 in the guide slot 92 through the upper fixing area as shown in FIGS. 8 and 9a may be sufficiently precise such that there is no need for slide elements 90 and the spacer element 21' in the lower fixing area for guiding the armrest in the guide slot 92 according to an exemplary embodiment. The spacer sleeve 20a moulded in one piece on the armrest 2 is then supported directly on the support plate 2' through an area 210" shown shaded in FIG. 9b.

Figure 11:
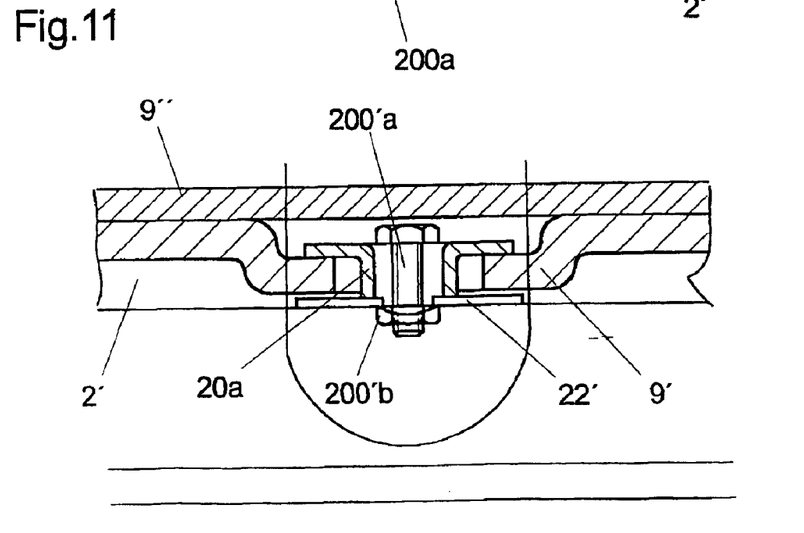
FIG. 11 shows an exemplary embodiment of a fixing area near a card pocket of a vehicle door.
Figure 12:
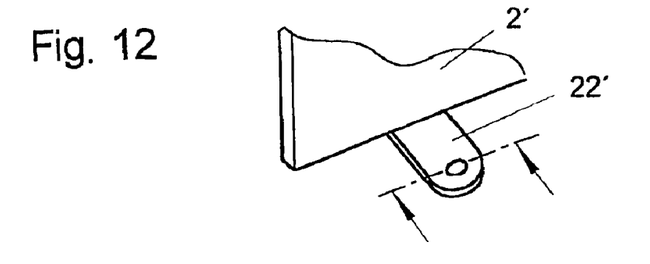
FIG. 12 is a partial perspective view that shows further details of the exemplary embodiment of FIG. 11.

FIG. 11 shows a section through a fixing area between the inside door trim in the region of a card pocket 9', 9" and a fixing bracket 22' angled out from the support plate 2' of the armrest. A perspective illustration of a section of the support plate 2' is also provided in FIG. 12. In this embodiment, a screw connection 200'a, 200'b is provided with a spacer bush 20a which is set in a comparatively larger opening of the inside trim in order to provide sufficient clearance for compensating tolerances between the inside trim 9 and the adjusting mechanism or its support plate

What is claimed is:

1. An armrest assembly for a motor vehicle door, comprising
   an armrest positionally adjustable through a drive unit,
   a spacer element which is integrally molded as one piece with the armrest;
   a transfer member to which the armrest is connectable and which is movable along an adjusting direction of the armrest when the drive unit is activated;
   at least one guide;
   at least one connecting element which extends within the spacer element and is movable together with the spacer element in a guide of the at least one guide;
   wherein the armrest is further positionally adjustable in at least one of a vehicle longitudinal direction and a further direction that is perpendicular to the vehicle longitudinal direction and perpendicular to the adjusting direction of the armrest, wherein the at least one guide aligns the armrest in the vehicle longitudinal direction and simultaneously guides the armrest along the adjusting direction, and wherein the armrest is connectable through the at least one connecting element to the transfer member which is movable within the at least one guide in the vehicle longitudinal direction.

2. The armrest assembly according to claim 1, wherein the drive unit and the transfer member are mounted as an adjusting mechanism on a common support which is fixable on a supporting part of a vehicle door.

3. The armrest assembly according to claim 2, wherein the drive unit and transfer member form one structural unit which generates an adjusting movement of the transfer member when the drive unit is activated.

4. The armrest assembly according to any one of the preceding claims, further comprising an inside door trim and wherein an adjustment of a position of the armrest is carried out so that the armrest is movable along the adjusting direction without the armrest causing the inside door trim to bulge during the adjustment.

5. An armrest assembly for a motor vehicle door, comprising:
   an armrest positionally adjustable through a drive unit;
   a transfer member to which the armrest is connectable and which is movable along an adjusting direction of the armrest when the drive unit is activated; and
   an elastic element, wherein the armrest is further positionally adjustable in at least one of a vehicle longitudinal direction and a further direction that is perpendicular to the vehicle longitudinal direction and perpendicular to the adjusting direction of the armrest and wherein the elastic element aligns the armrest in the further direction.

6. The armrest assembly according to claim 1, wherein the armrest engages with a guide element of the at least one guide.

7. The armrest assembly according to claim 5, further comprising an indoor trim and wherein the elastic element is mounted between the indoor trim and the armrest or transfer member.

8. The armrest assembly according to claim 5 or 7, wherein a distance between the armrest or the transfer member, and an indoor trim is adjustable by deformation of the elastic element.

9. The armrest assembly according to claim 5, further comprising a connecting element through which the armrest is connectable to the transfer member and wherein the elastic element is deformed by the connecting element.

10. The armrest assembly according to claim 1, wherein the connecting element is movable within the spacer element in the vehicle longitudinal direction.

11. The armrest assembly according to claim 1, further comprising a guide frame disposed along an edge of the guide.

12. The armrest assembly according to claim 1, wherein the guide is disposed in an inside door trim.

13. The armrest assembly according to claim 1, wherein the guide extends between the transfer member and the armrest.

14. An armrest assembly for a motor vehicle door, comprising:
   an armrest positionally adjustable through a drive unit;
   an indoor trim; and
   a transfer member to which the armrest is connectable and which is movable along an adjusting direction of the armrest when the drive unit is activated, wherein the armrest is further positionally adjustable in at least one of a vehicle longitudinal direction and a further direction that is perpendicular to the vehicle longitudinal direction and perpendicular to the adjusting direction of the armrest, and the transfer member and the armrest are mounted on opposed sides of the indoor trim.

15. The armrest assembly according to claim 9, further comprising a spacer element wherein the connecting element acts through the spacer element on the elastic element which encompasses the connecting element.

16. An armrest assembly for a motor vehicle door, comprising an armrest positionally adjustable through a drive unit:
   a transfer member to which the armrest is connectable and which is movable along an adjusting direction of the armrest when the drive unit is activated;
   a gearing mounted on an output side of the drive unit and which includes at least one gear part movable in the adjusting direction; and
   fixing mechanism disposed on the gear part and which fix the transfer member, wherein the armrest is further positionally adjustable in at least one of a vehicle longitudinal direction and a further direction that is perpendicular to the vehicle longitudinal direction and perpendicular to the adjusting direction of the armrest.

17. The armrest assembly according to claim 16, further comprising a guide rail and wherein the gear part is movable along the guide rail.

18. The armrest assembly according to claim 16, wherein the gear part is mounted in a guide rail.

19. The armrest assembly according to claim 16, wherein the gearing comprises a spindle or rack and pinion gearing.

20. The armrest assembly according to claim 2, wherein the common support includes at least one guide rail on which the transfer member is guided.

21. The armrest assembly according to claim 20, wherein a slide device is provided on the at least one guide rails and guide the transfer member.

22. The armrest assembly according to claim 20 or 21, wherein the at least one guide rail comprises two guide rails which each extend in the adjusting direction of the armrest.

23. The armrest assembly according to claim 2, wherein the common support has a mounting unit for mounting the drive unit.

24. The armrest assembly according to claim 23, wherein the mounting unit surrounds the drive unit in part.

25. A method for mounting an armrest assembly having an adjustable armrest, the method comprising:
   providing a motor vehicle door including an armrest assembly having an armrest and a door trim, the armrest adjustable in an adjustment direction and connectable to a moveable transfer member; and
   adjusting the armrest relative to the door trim in at least one of a vehicle longitudinal direction and a further direction perpendicular to the vehicle longitudinal direction and perpendicular to the adjusting direction, wherein the adjusting of the armrest in the further direction includes deforming an elastic element.

26. The method according to claim 25, wherein the adjusting in the vehicle longitudinal direction is carried out by a guide.

27. The method according to claim 25, wherein the providing step includes the adjustment direction being substantially vertical.

28. The armrest assembly according to claim 1, wherein the adjusting direction is substantially vertical.

29. The armrest assembly according to claim 1, wherein the armrest is disposed on the motor vehicle door, and is positionally adjustable and further positionally adjustable relative to the motor vehicle door.

* * * * *

UNITED STATES PATENT AND TRADEMARK OFFICE
CERTIFICATE OF CORRECTION

PATENT NO. : 6,905,163 B2
DATED : June 14, 2005
INVENTOR(S) : Börnchen et al.

It is certified that error appears in the above-identified patent and that said Letters Patent is hereby corrected as shown below:

Title page,
Item [75], Inventors, delete "Nuremberg (DE)" insert -- Nürnberg (DE) --.
Item [73], Assignee, delete "Co., KG, Coburg (DE)" insert -- Co., KG, Coburg, Coburg (DE) --.

Column 10,
Line 4, delete "comprising an armrest", insert -- comprising:
                                      an armrest --.
Line 5, delete "unit:", insert -- unit; --.
Line 12, delete "fix", insert -- fixes --.
Line 29, delete "rails", insert -- rail --.
Line 30, delete "guide", insert -- guides --.

Signed and Sealed this

Twenty-fifth Day of April, 2006

JON W. DUDAS
*Director of the United States Patent and Trademark Office*